(12) United States Patent
Leenhouwers et al.

(10) Patent No.: US 9,836,305 B1
(45) Date of Patent: Dec. 5, 2017

(54) SYSTEMS AND METHODS FOR TASK PARALLELIZATION

(71) Applicant: Misys Global Limited, London (GB)

(72) Inventors: Bram Leenhouwers, Paris (FR); Edouard Gabreau, Paris (FR); Meggie Grimaud, Paris (FR); Alexis Antonov, Paris (FR)

(73) Assignee: Misys Global Limited, London (GB)

( * ) Notice: Subject to any disclaimer, the term of this patent is extended or adjusted under 35 U.S.C. 154(b) by 44 days.

(21) Appl. No.: 14/936,925

(22) Filed: Nov. 10, 2015

Related U.S. Application Data

(60) Provisional application No. 62/135,068, filed on Mar. 18, 2015.

(51) Int. Cl.
 *G06F 9/38* (2006.01)
 *G06F 9/45* (2006.01)

(52) U.S. Cl.
 CPC .............. *G06F 9/3885* (2013.01); *G06F 8/40* (2013.01)

(58) Field of Classification Search
 CPC .................................................. G06F 9/3885
 See application file for complete search history.

(56) References Cited

U.S. PATENT DOCUMENTS

| 2007/0169018 A1* | 7/2007 | Coward | G06F 8/51 717/136 |
| 2008/0141055 A1* | 6/2008 | Danilak | G06F 11/1076 713/340 |
| 2010/0287540 A1* | 11/2010 | Takai | G06F 9/45512 717/137 |
| 2015/0006835 A1* | 1/2015 | Oberhofer | G06F 9/5077 711/162 |
| 2015/0007152 A1* | 1/2015 | Hamman | G06F 8/423 717/146 |

OTHER PUBLICATIONS

Aon Benfield Securities, Inc, Hedging Strategy Simulation and Backtesting with DSLs, GPUs and the Cloud, GPU Technology Conference 2013.*
Konig et al., Groovy in Action, Second Edition, version 11, Copyright 2011 Manning Publications.*

* cited by examiner

*Primary Examiner* — Charlie Sun
(74) *Attorney, Agent, or Firm* — Sheppard Mullin Richter & Hampton LLP

(57) ABSTRACT

Various embodiments of the present disclosure can include systems, methods, and non-transitory computer readable media configured to obtain at least one script and at least one document, wherein the script includes one or more instructions to be translated for execution in a parallelized computing environment, and wherein the document includes data that is referenced by the script. A syntax tree for the script can be determined. At least one approach for optimizing the syntax tree can be applied. Parallelized code for execution in the parallelized computing environment can be generated. A binary representation of the document can be determined. The parallelized code can be processed based at least in part on the binary representation of the document.

18 Claims, 11 Drawing Sheets

SYSTEMS AND METHODS FOR TASK PARALLELIZATION

CROSS-REFERENCE TO RELATED APPLICATIONS

The present applications claims priority from U.S. Provisional Patent Application Ser. No. 62/135,068, filed Mar. 18, 2015, entitled "Systems and Methods for Parallel Processing to Run Analytics on GPUs", which is incorporated herein by reference.

FIELD OF THE INVENTION

The present technology relates to parallel programming. More particularly, the present technology relates to the optimization and translation of tasks for parallel execution.

BACKGROUND

Organizations often need to perform computationally-intensive tasks in their day-to-day business activities. For example, a bank may need to compute thousands of pricing models (e.g., forward contracts) within a short amount of time. In some instances, to facilitate the expedited processing of such computing tasks, some organizations may employ parallel processing techniques that enable the tasks to be executed concurrently, for example, by dividing the tasks across a parallel ized computing environment (e.g., graphics processing units (GPUs), multi-core processors, and/or compute nodes in a cluster). Such parallelization can require use of complex frameworks, such as OpenCL or Compute Unified Device Architecture (CUDA).

In many instances, a task, or parameters of the task, can be defined by entities that are different from the entities that are involved with the parallelization of that task. In one example, financial analysts may be involved with defining the terms of a deal or pricing model. However, given the complexity of parallelization frameworks, translating such deals or pricing models to be executed concurrently is typically a job that is reserved for software engineers. Such division of labor can create unnecessary bottlenecks in the day-to-day operation of a business, since any programs created by software engineers will often need to be validated, for example, by financial analysts.

SUMMARY

Various embodiments of the present disclosure can include systems, methods, and non-transitory computer readable media configured to obtain at least one script and at least one document, wherein the script includes one or more instructions to be translated for execution in a parallelized computing environment, and wherein the document includes data that is referenced by the script. A syntax tree for the script can be determined. At least one approach for optimizing the syntax tree can be applied. Parallelized code for execution in the parallelized computing environment can be generated. A binary representation of the document can be determined. The parallelized code can be processed based at least in part on the binary representation of the document In an embodiment, the script is written in the Groovy programming language and the syntax tree can be obtained using an application programming interface (API) of the Groovy programming language.

In an embodiment, at least one inferred type for at least one variable referenced in the syntax tree can be determined.

In an embodiment, a determination can be made that the variable corresponds to a binary statement that includes a minus operator and a determination can be made that the variable is one of a "double" type, a "date" type, a string type, a Boolean type, custom structured data, an array of some type, a matrix of some type, or a cube of some type.

In an embodiment, a determination can be made that the variable corresponds to a binary statement that includes a multiplication operator and a determination can be made that the variable is one of a "double" type, a "date" type, a string type, a Boolean type, custom structured data, an array of some type, a matrix of some type, or a cube of some type.

In an embodiment, a determination can be made that the variable corresponds to an assignment statement that references a second variable and a determination can be made that the variable corresponds to a same type as the second variable.

In an embodiment, at least one call in the script can be replaced with a call to a raw function corresponding to the parallelized code.

In an embodiment, the parallelized code corresponds to the OpenCL parallelization framework, Compute Unified Device Architecture (CUDA) parallelization framework, or Java bytecode.

In an embodiment, the parallelized code can be determined by at least transforming the optimized syntax tree to a parallelization framework code.

In an embodiment, a dictionary corresponding to the document can be determined, wherein the dictionary stores data included in the document, and wherein the data stored in the dictionary is ordered to optimize memory usage.

In an embodiment, data corresponding to a string value type is translated to a first number of bits, wherein data corresponding to a numerical value type is translated to a second number of bits, and wherein data corresponding to a date value type is translated to a third number of bits.

In an embodiment, a result of at least one instruction included in the script can be pre-computed, wherein the result is stored in the binary representation of the document.

In an embodiment, the syntax tree is updated to replace a reference to the instruction with a reference to the pre-computed result.

In an embodiment, an amount of memory needed for the document can be pre-computed, wherein information indicating the amount of memory is stored in the binary representation of the document.

In an embodiment, memory can be allocated prior to executing the parallelized code based at least in part on the information indicating the amount of memory needed for the document.

In an embodiment, at least one second document can be obtained, wherein the second document includes data that is referenced by the script. A binary representation of the second document can be determined. The parallelized code can be processed based at least in part on the binary representation of the second document.

In an embodiment, memory for the document can be allocated prior to executing the parallelized code. Memory for the second document can be allocated when executing the parallelized code, wherein the memory allocated for the document and the memory allocated for the second document is coalesced.

In an embodiment, at least one second document can be obtained, wherein the second document includes data that is referenced by the script. A binary representation of the second document can be determined. An interlaced binary structure can be determined based at least in part on the binary representation of the document and the binary representation of the second document. The parallelized code can be processed with respect to the document and the second document based at least in part on the interlaced binary representation.

Many other features and embodiments of the invention will be apparent from the accompanying drawings and from the following detailed description.

Figure 1:
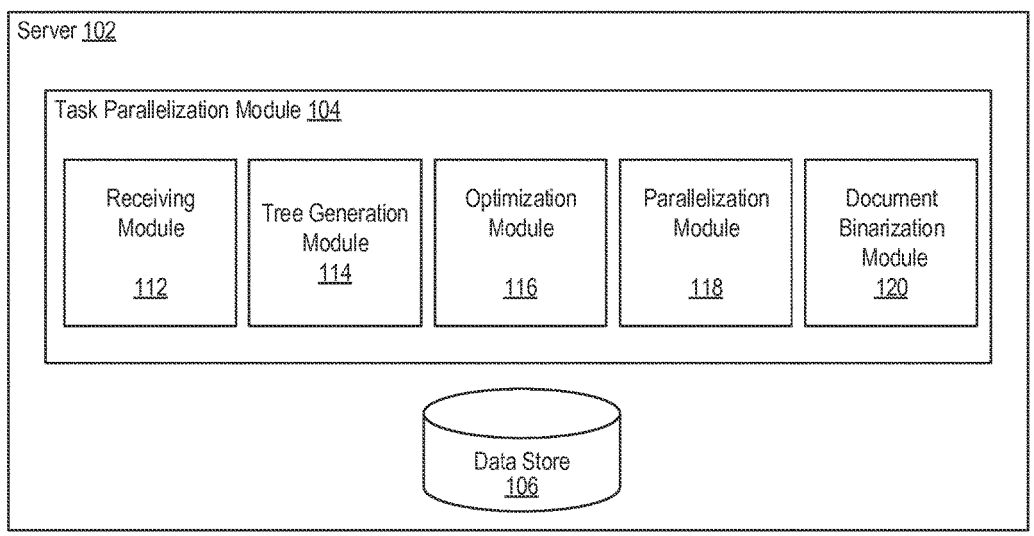
FIG. 1 illustrates an example system, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Task Parallelization

Organizations, such as banks and financial institutions, often need to perform computationally-intensive tasks in their day-to-day business activities. These tasks may involve generating pricing or forecasting models, for example. To be competitive, organizations typically need to be able to compute such tasks quickly and accurately. As noted, one approach to achieving such results is to parallelize such tasks so that the tasks can be executed concurrently across GPUs, processors, and/or compute nodes.

However, in many instances, the tasks being computed (e.g., pricing models, forecasting models, etc.) are typically defined by entities that are different (e.g., financial analysts) from the entities (e.g., software engineers) that are responsible for translating the tasks to be executed in a parallel environment. Such division of labor can create unnecessary bottlenecks in the day-to-day operation of a business, since the two entities involved will typically need to communicate during the translation and validation of the parallelized tasks. Even in instances where such division of labor does not exist, the complex process of translating a task for execution in a parallelized computing environment, for example, across GPUs, can also lead to unnecessary bottlenecks in the operation of the business.

In various embodiments, the present disclosure addresses these and other drawbacks associated with conventional techniques. The present disclosure provides techniques for automatically translating and optimizing tasks for execution in a parallelized computing environment. For example, a task (e.g., pricing a financial transaction at various dates in the future) to be performed may be described as a set of instructions and these instructions may be included in a computer script. The computer script (or program) can be written using a programming language, such as Groovy. The scripting process is simplified so that such scripts can be written by financial analysts with limited involvement by software engineers. As a result, the bottlenecks typically associated with dividing responsibilities between financial analysts and software engineers is reduced. Depending on the implementation, the script can be interpreted by a run-time environment for purposes of executing the instructions described in the script. Alternatively, the script can be compiled, for example, to bytecode, and then executed. In either case, a syntax tree for the script can be generated. The syntax tree can be optimized using various approaches to help improve the speed at which the script can be executed. Once optimized, the syntax tree can be translated to a parallel processing framework (e.g., OpenCL, CUDA, etc.) that allows concurrent execution for execution of the task in a parallelized computing environment.

In addition to translating the script to a parallel processing framework, the approaches described herein can also optimize and translate any corresponding documents for the script into binary form. As mentioned, the script may describe a task for pricing a financial transaction at various dates in the future. Since this script performs operations that may be applicable to other financial transactions, in various embodiments, the attributes or parameters to be used by the script as inputs are included in a separate document (e.g., JavaScript Object Notation (JSON) file). In this example, the document for the script can define values for the type of currency to use for pricing the financial transaction, the dates to be used for pricing the transaction, the notional value, to provide some examples. When a different financial transaction needs to be priced using the same script, any relevant values needed for the computation can be included in a different document that is utilized when executing the script. By utilizing such a document-based approach, different documents can be created for different tasks (e.g., deals) and the script can be executed against each of the documents in parallel.

FIG. 1 illustrates an example system 100 including a server 102. The server 102 can include a task parallelization module 104 that can be used to transform a script for concurrent execution in a parallelized computing environment, as discussed in more detail herein. The components of the task parallelization module 104 may communicate with a data store 106. The data store 106 can be configured to store and maintain various types of data to facilitate the transformation of scripts for parallel execution, as discussed in more detail herein. It is noted the components shown in this figure and all figures herein are exemplary only, and other implementations may include additional, fewer, integrated, or different components. Some components may not be shown so as not to obscure relevant details.

The task parallelization module 104 can include a receiving module 112, a tree generation module 114, an optimization module 116, a parallelization module 118, and a document binarization module 120. The receiving module 112 can be configured to receive items to be translated to be executed concurrently. Such items (e.g., scripts, documents, etc.) can be provided to the receiving module 112 through an interface, such as an application programming interface (API).

The tree generation module 114 can be configured to generate a corresponding syntax tree for any scripts that are provided to the task parallel ization module 104. As mentioned, a task to be performed may be described as a set of instructions and these instructions may be provided in the form of a computer script. The term "script", as used herein, can refer to any set of instructions that are able to be interpreted for execution by a processor. In various embodiments, the computer script can be written using a programming language, such as Groovy. In such embodiments, an abstract syntax tree corresponding to the script can be generated using an API that is provided by the Groovy programming language. More details regarding the syntax tree are provided below in reference to FIG. 3.

The optimization module 116 can be configured to optimize the execution of a script by evaluating and optimizing the abstract syntax tree corresponding to the script. The abstract syntax tree provides an in-memory representation of the script. The abstract syntax tree can be optimized and used to generate corresponding code that has been optimized for concurrent execution. For example, the tree can be optimized and be used to generate optimal OpenCL code for concurrent execution in a GPU-based parallel computing environment. More details regarding the optimization process are discussed below in reference to at least FIGS. 4 and 5. The parallelization module 118 can be configured to transform, or compile, the optimized syntax tree to a parallel processing framework (e.g., OpenCL, CUDA, Java bytecode, etc.) for concurrent execution. The document binarization module 120 can be configured to determine a binary representation of a document. More details regarding the binarization process are discussed below in reference to at least FIGS. 6-9.

In some embodiments, the task parallelization module 104 can be implemented as a dedicated mobile application running on a mobile device or as functionality provided by a browser running on the mobile device. Examples of mobile devices include smart phones, tablets, laptops, and wearable devices. Further, in some instances, one or more non-mobile devices may be used instead of the mobile devices.

Figure 2:
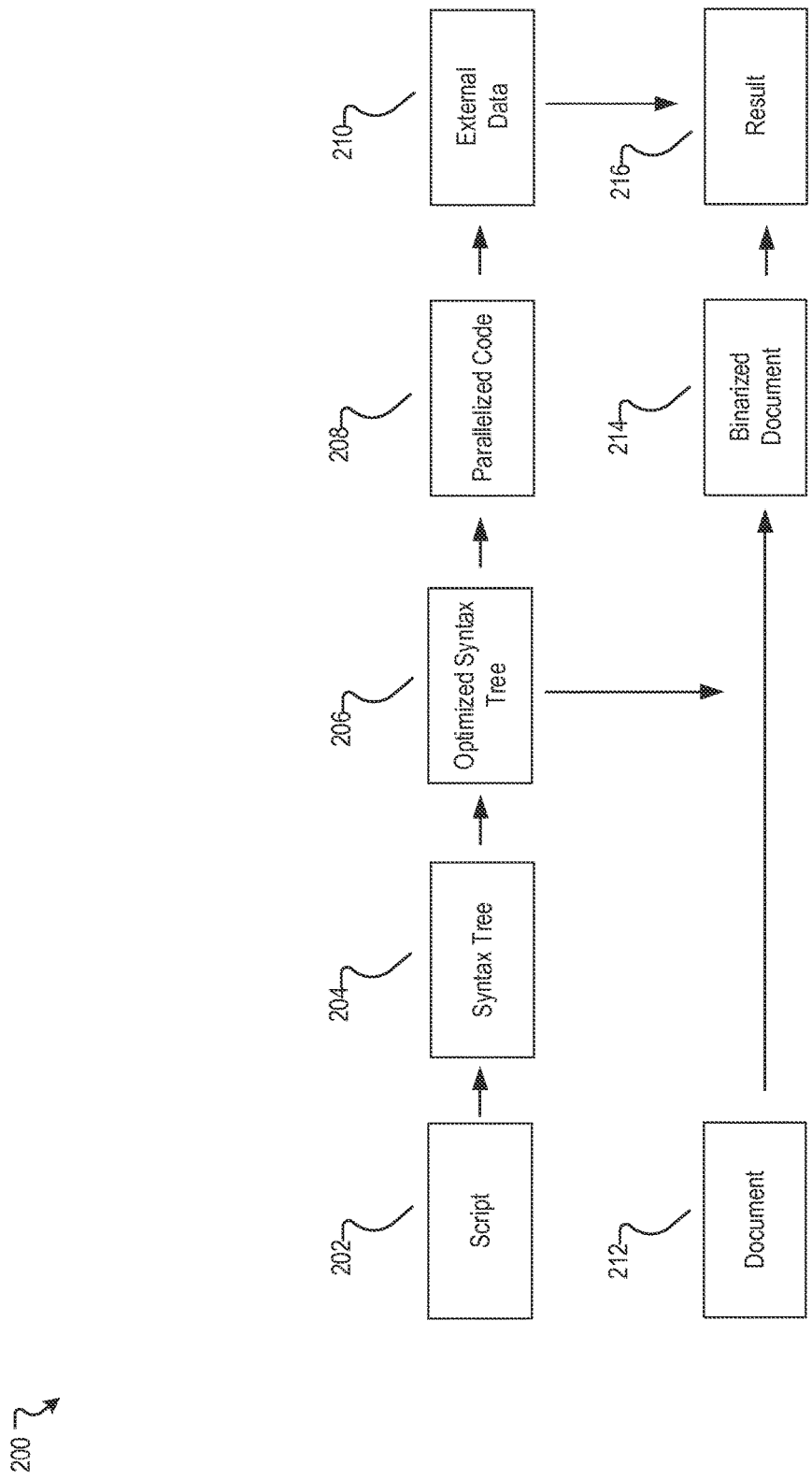
FIG. 2 illustrates an example of framework for automatically translating and optimizing tasks for execution in a parallelized computing environment, according to an embodiment of the present disclosure.

FIG. 2 illustrates an example of framework 200 for automatically translating and optimizing tasks for execution in a parallelized computing environment, according to an embodiment of the present disclosure. It is noted the components shown in this figure and all figures herein are exemplary only, and other implementations may include additional, fewer, integrated, or different components. Some components may not be shown so as not to obscure relevant details.

Figure 3:
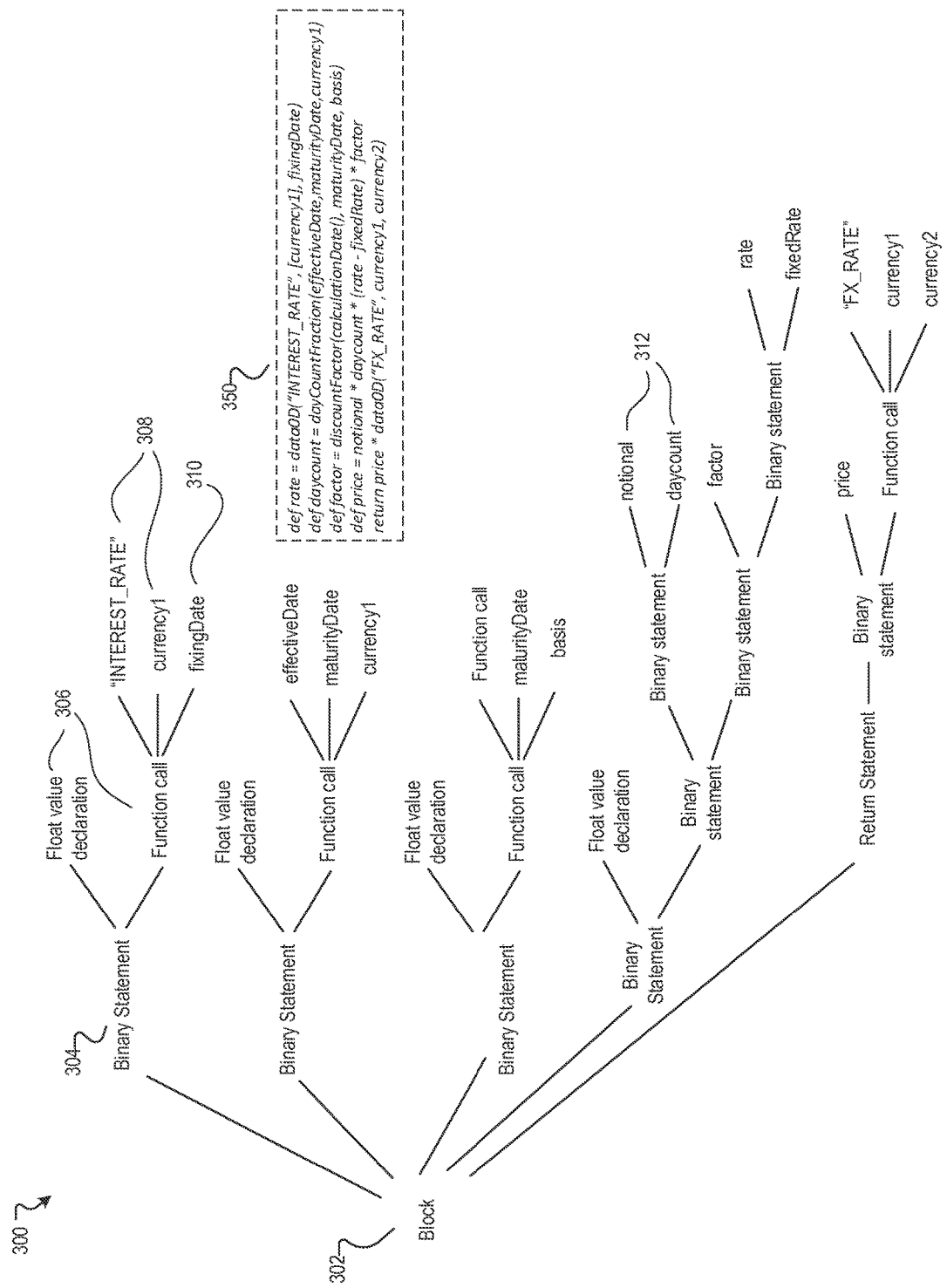
FIG. 3 illustrates an example of a syntax tree that can be generated from a script, according to an embodiment of the present disclosure.

As shown in FIG. 2, the example framework 200 can involve generating a syntax tree 204 from a script 202, as described further in reference to FIG. 3. The syntax tree 204 can be optimized 206 using various approaches. The optimized syntax tree 206 can then be used to generate parallelized code (e.g., OpenCL, CUDA, Java bytecode, etc.) 208 that can be executed concurrently, for example, in a parallelized computing environment.

In various embodiments, the script 202 may be configured to reference data that is included in corresponding documents 212. As mentioned, an example script may describe a task for pricing a financial transaction at various dates in the future. In this example, a document for the script can define values for the type of currency to use for pricing the financial transaction, the dates to be used for pricing the transaction, the notional value, to provide some examples. In such instances, the document(s) 212 corresponding to the script 202 can be binarized 214, or converted to a binary structure, so that the data included in the document can be efficiently stored to maximize the memory, or cache, capabilities, for example, of computing devices (e.g., processors or graphics processing units (GPUs)). The parallelized code 208 and the binarized document 214 can be used to generate the result 216 based at least in part on any external data 210 (e.g., market data) that is needed to compute the result 216. More details regarding each portion of the framework 200 are provided below.

FIG. 3 illustrates an example 300 of a syntax tree 302 that can be generated from a script 350, according to an embodiment of the present disclosure. The tree 302 can be an abstract syntax tree (AST) that provides an in-memory representation of the code included in the script 350. In other words, the tree 302 can provide an ordered, rooted representation of the syntactic structure of the script 350. The tree 302 for the script 350 can be created using generally known techniques and/or software. In various embodiments, the script can be written in the Groovy computer programming language. In such embodiments, the tree 302 corresponding to the script 350 can be generated using an API provided by the Groovy programming language. Each node (e.g., node 304) of the tree 302 can correspond to a different type (e.g., binary statement, float value declaration, variable, etc.) and, further, each node can have any number of child nodes (e.g., nodes 306). Additionally, each node can correspond to a different type of data value. For example, in the tree 302, the nodes 308 both correspond to a respective string value, the node 310 corresponds to a date value, the nodes 312 both correspond to a respective floating point value. Once generated, the tree 302 can be optimized, as described below in reference to FIGS. 4 and 5.

Figure 4:
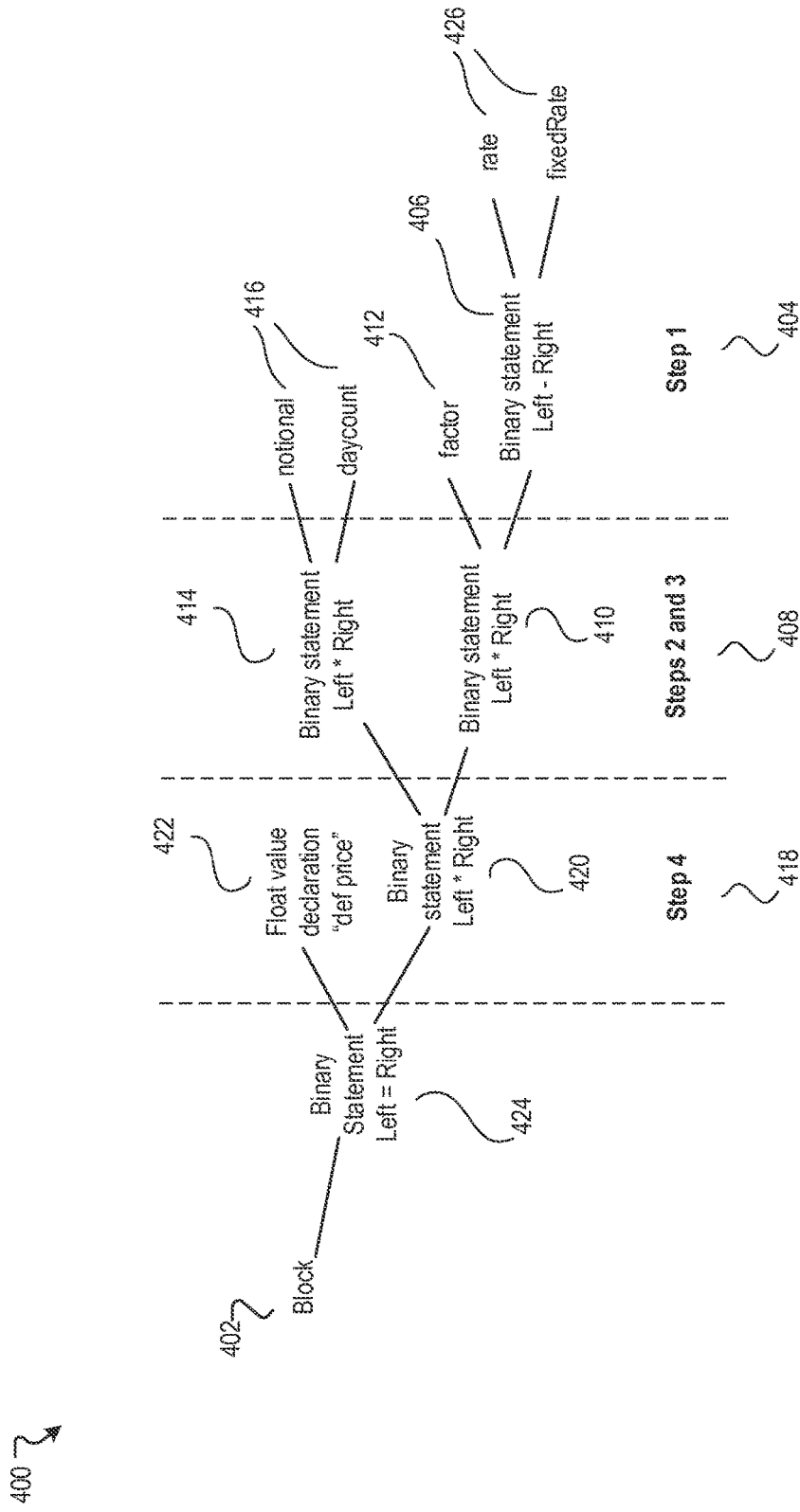
FIG. 4 illustrates an example approach for optimizing a syntax tree, according to an embodiment of the present disclosure.

FIG. 4 illustrates an example approach 400 for optimizing a syntax tree 402, according to an embodiment of the present disclosure. As mentioned, the execution of a script can be optimized by evaluating and optimizing the abstract syntax tree 402 corresponding to the script. The tree 402 can be optimized and then be used to generate optimal parallel code for concurrent execution in a parallel computing environment.

In various embodiments, the script from which the tree 402 is generated can be written in a typeless computer programming language. Typically, programming languages use variables to manage data. Some programming languages, known as "typed" languages, can require users to specify a respective type for each variable. For example, a variable corresponding to an integer (e.g., 7) can be specified as an integer variable. In another example, a variable corresponding to a floating point value (e.g., 7.6) can be declared as a floating point variable. Similarly, a variable corresponding to text (e.g., "example") can be specified as a string variable. A typeless language typically does not require such explicit declarations of variable types. Instead, in typeless languages, such variable types can be determined automatically.

When optimizing the tree 402, the type can be determined for each variable that is referenced in the script. In various embodiments, the optimal types for the variables can be determined by evaluating the context and usage of those variables in the script. For example, if a function referenced in the script is used to compute a logarithm of a variable (e.g., log(myVariable)), then the type for the variable (e.g., "myVariable") can be determined to be a floating point value or "double". There may be instances in which the optimal type cannot be easily determined due to an operation or function being able to have multiple input types. The following is an example of a type ambiguous function:

def equalsOrAbove(a, b) {
  return (a==b||a>b)
}

In this example, the function "(a==b)" suggests that both variables "a" and "b" are of the same type. Further, the function "(a>b)" indicates that the variables "a" and "b" can be compared to one another, which indicates that the variables "a" and "b" are not strings. However, in this example, variables "a" and "b" can still be a floating point type (e.g., double) or a date type. In such instances, the type can be determined based on the parameters that are passed to the example function.

In the example approach 400 of FIG. 4, each portion of the tree 402 can be evaluated to determine the optimal types for the different variables or functions referenced by the tree 402. The approach 400 can begin with Step 1 (404), which includes a binary statement 406 that includes a minus ("–") operator. In some embodiments, binary statements that include the minus operator can be determined to correspond to a date type or a double type. In Step 2 (408), the binary statement 410 includes a multiplication ("*") operator. In some embodiments, binary statements that include the multiplication operator can be determined to correspond to a double type. Thus, in the example of FIG. 4, the type for the variable "factor" 412 can be determined to correspond to the type double. In Step 3 (408), the binary statement 414 also includes a multiplication ("*") operator. Therefore, the respective types for the variables "notional" and "daycount" 416 can also be determined to correspond to the type double. In various embodiments, assignment statements ("=") 424 will propagate the type between operands. Thus, in Step 4 (418), since the binary statement 420 includes a multiplication ("*") operator, the "price" variable 422 can also be determined to correspond to the type double.

The approach 400 described above can allow for determining an optimal type in most instances. However, the respective types for the variables "rate" and "fixed Rate" 426 are still unknown other than the two variables are of the same type, since the minus ("–") operator is included in the binary statement 406. The respective types for these variables can be determined once the detected types for all of the statements in the tree 402 are merged. Once merged, the first statement will indicate that the "rate" and "fixed Rate" variables correspond to the type double.

Figure 5:
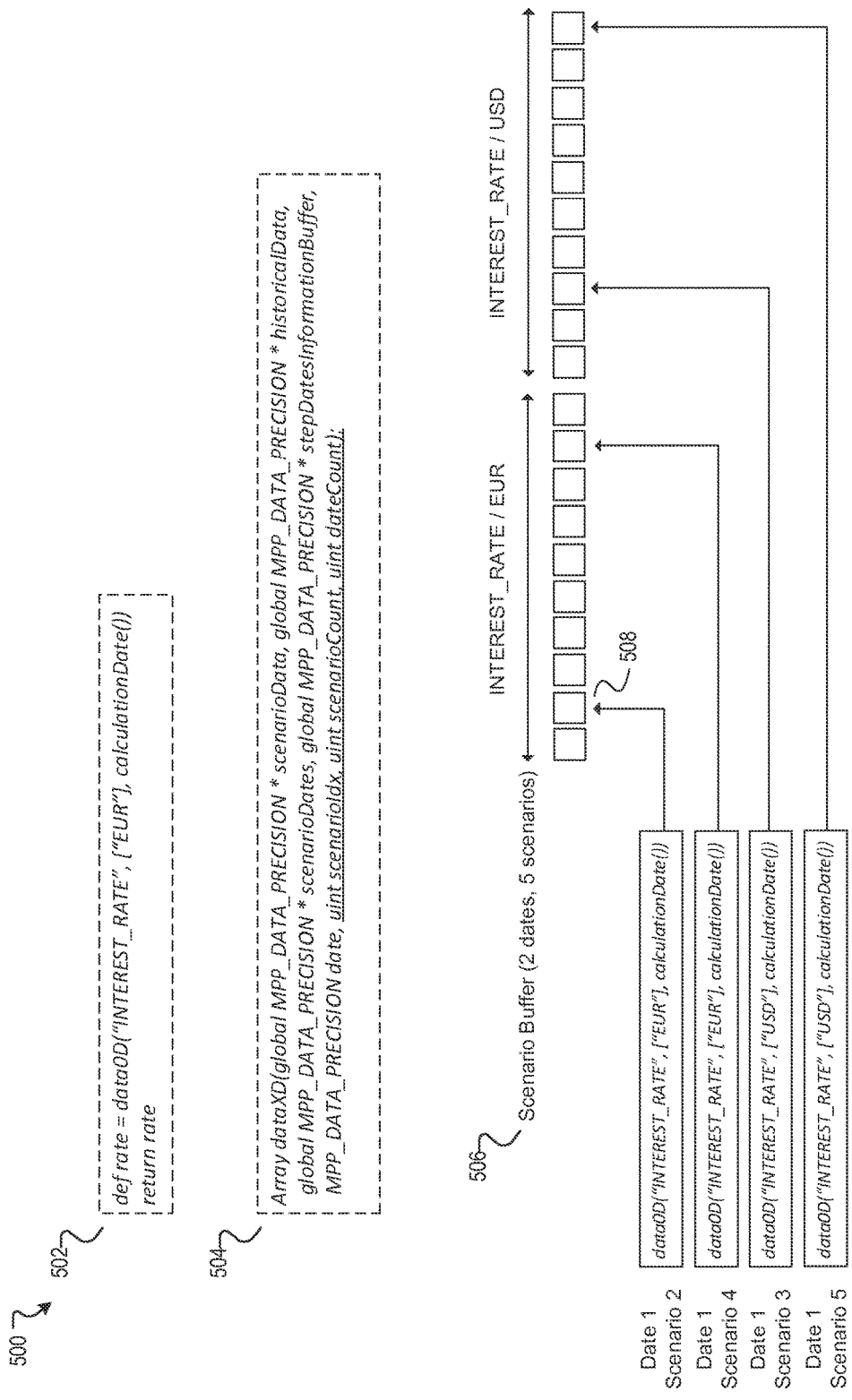
FIG. 5 illustrates coalescence of a buffer used for script execution, according to an embodiment of the present disclosure.

FIG. 5 illustrates coalescence of a buffer used for script execution, according to an embodiment of the present disclosure. For example, the buffer may be a market data buffer that is used for script execution. Typically, specialized parallelization functions can be called in scripts to access data in a concurrent, or multi-threaded, environment. In various embodiments, a tree for a script that references such functions can be optimized by intercepting and/or replacing such functions with calls to raw parallelization functions corresponding to a particular framework (e.g., OpenCL, CUDA, Java bytecode, etc.) to which the script is to be translated. In the example of FIG. 5, the script 502, which references such parallelization functions, can be translated to the example optimal raw parallelization function 504.

For example, the function calculationDate( ) can be a parallelization function that is used to access parallel data. In various embodiments, the function calculationDate( ) can be used to obtain a date for which a calculation (e.g., pricing) is to determined. In another example, the function dataXD( ) can also be used to obtain parallel data, where X is 0 ("data0D( )") when obtaining a scalar value, 1 ("data1D( )") when obtaining an array of values, 2 ("data2D( )") when obtaining a matrix, and 3 ("data3D( )") when obtaining a cube.

In the example of FIG. 5, the script 502 references such parallelization functions to obtain a rate in euros using market data ("INTEREST_RATE", ["EUR"]) and the calculationDate( ) function. In this example, if the script 502 were run against 10 different values for the market data ("INTEREST_RATE", ["EUR"]), then each processor (or GPU) core would yield a different result. When optimizing the script 502, the calls to the data0D( ) function can be intercepted and/or replaced with calls to raw parallelization functions (e.g., OpenCL parallelization functions) that are able to detect which thread is being executed and can return a different value based on this information. In addition to the actual parameters (e.g., the type of the data, the qualifiers, and the date at which they are requested), the raw parallelization functions can be provided with a pointer to the scenario buffer 506 that contains the actual data to be retrieved as well as information for navigating within this buffer 506. Such information can include, for example, the calculation dates, size of the simulation, type (e.g., array, matrix, cube), and the size of the corresponding data structure. The scenario buffer 506 can be sent to the parallelized computing environment (e.g., GPU).

In this example, for the dataXD( ) parallelization function, the GPU can determine the link between parameters of a call (e.g., function calls included in a script and/or document) and the scenario buffer 506 index. In various embodiments, a hash table is used to determine such correlations. For example, the respective identifier of each scenario can be hashed to a bucket (e.g., the bucket 508) in the scenario buffer 506. The respective identifier, together with the memory offsets of the corresponding data, can both be stored in this bucket. As a result, the scenario buffer 506 can easily be navigated for any dataXD( ) parameter with a memory and runtime complexity of O(1). In various embodiments, the scenario buffer 506 can be coalesced or interlaced to optimize cache usage, as described below in reference to FIG. 9. In this example, the scenario buffer 506 is coalesced to improve cache usage (e.g., GPU L1 cache). With respect to the calculateDate( ) parallelization function, in various embodiments, each call to this function can be replaced with an access to a pre-filled dates buffer and is offset by the identifier of the date that the thread (e.g., GPU thread) is currently working on. In some instances, the dataXD( ) and the calculationDate( ) functions can be used simultaneously. In such instances, a Cartesian product of the possible values for the dataXD( ) and calculationDate( ) calls can be determined. For example, 10 values for "INTEREST_RATE/EUR" at 10 different dates would result in 100 different results.

Figure 6:
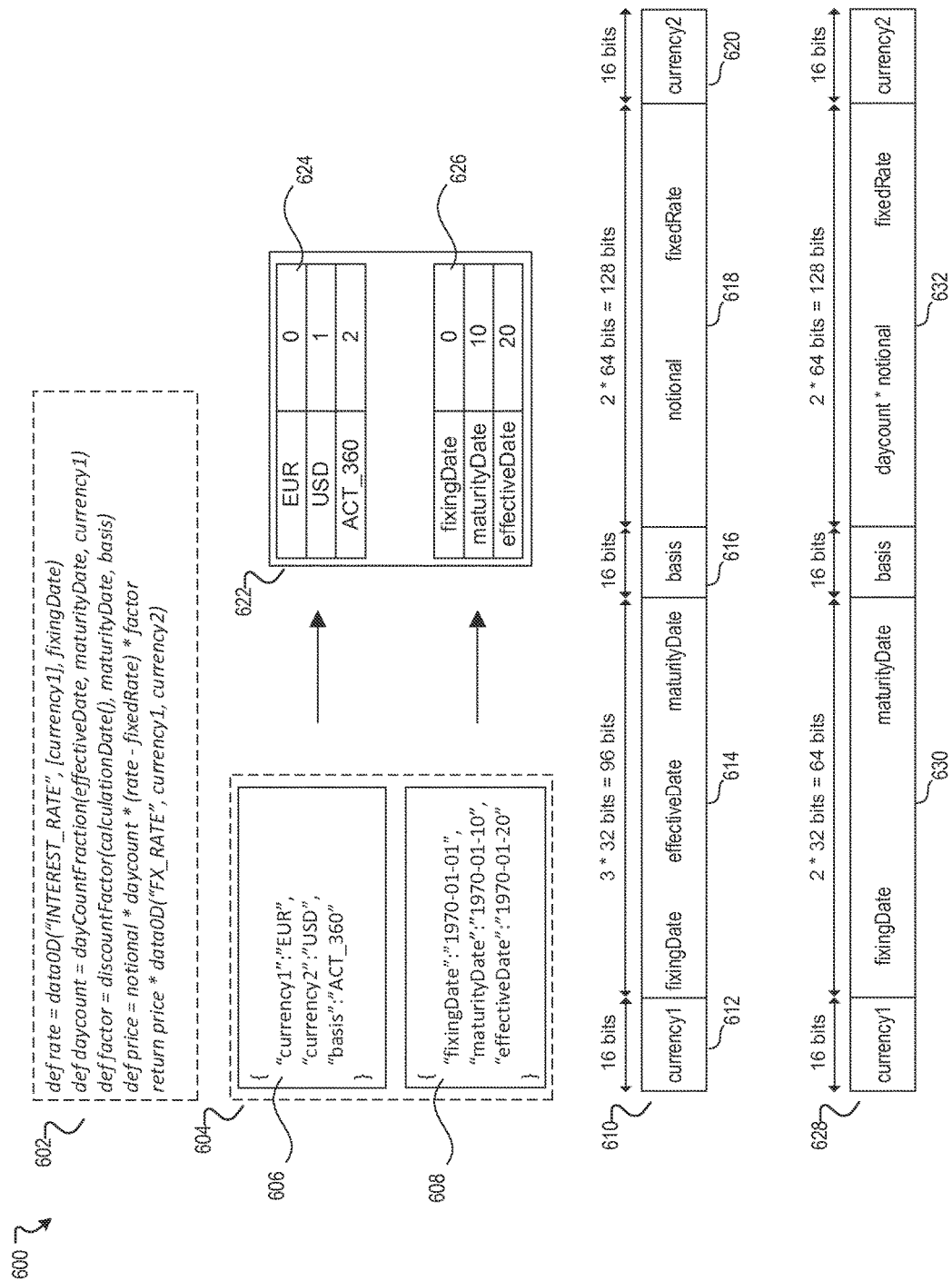
FIG. 6 illustrates an example approach for binarizing a document, according to an embodiment of the present disclosure.

FIG. 6 illustrates an example approach 600 for binarizing a document, according to an embodiment of the present disclosure. As mentioned, in various embodiments, a script may be configured to reference data that is included in one or more corresponding documents. In the example of FIG. 6, the script 602 references the variables "currency1", "currency2", "basis", "fixingDate", "maturityDate", and "effectiveDate". These referenced variables are defined in a separate document 604, as shown in FIG. 6. In various embodiments, once the script 602 is translated for execution in a parallelized computing environment, the corresponding document 604 can be binarized to facilitate concurrent execution of the script 602 in the parallelized computing environment. When binarizing the document 604, the data 606, 608 associated with the document 604 can be stored in a binary structure 610. The representation of the binary structure 610 can be based on the detected type for each field (e.g., strings, dates, values, Booleans, arrays, matrixes, cubes, etc.) in the script 602. In various embodiments, the fields are ordered in the binary structure 610 to maximize cache (e.g., GPU cache) capabilities. For example, two fields used in the same instruction are likely to be accessed in memory at the same time. Based on this observation, such fields can be ordered next to, or in proximity to, each other in the binary structure.

In various embodiments, to allow for faster comparisons and efficient storage of data, fields corresponding to the string type (e.g., "currency1", "currency2" and "basis") can be translated to a 16 bit short based dictionary 622. This dictionary can be specific to the document 604 being binarized. As illustrated in the dictionary 622 of FIG. 6, the fields 606 corresponding to the string type are converted to 16 bit short values 624. Similarly, fields corresponding to the date type (e.g., "fixingDate", "maturityDate", "effectiveDate") can be translated to a 32 bit integer that represents the number of days from a predefined date (e.g., 1970-01-01). As illustrated in the dictionary 622, the fields 608 corresponding to the date type are converted to 32 bit integer values 626. Depending on the implementation, fields corresponding to the value type (e.g., "notional", "fixed Rate") can be converted to either a 32 bit or a 64 bit floating point value. The dictionary 622 can be accessed from memory during execution of the script 602. Since multiple documents may be utilized at the processing (e.g., pricing) stage, in some embodiments, the corresponding dictionaries of the multiple documents can be merged to be consistent in memory (e.g., GPU memory).

Thus, as shown in the example of FIG. 6, the binary structure 610 allocates 16 bits for storing data corresponding to the variable "currency1" 612, 96 Bits for storing data corresponding to the variables "fixingDate", "effectiveDate", and "maturityDate" 614, 16 bits for storing data corresponding to the variable "basis" 616, 128 bits for storing data corresponding to the variables "notional" and "fixed Rate" 618, and 16 bits for storing data corresponding to the variable "currency2" 620.

The binary structure 610 provides a number of advantages. For example, compared to its text-based form 604, the representation in the binary structure 610 can maximize cache access while reducing most comparison operations to be simple integer comparisons. Further, string comparisons can have their complexity and memory access cost reduced from O(<string length>) to O(1) in terms of big-O notation.

Additionally, in this example, the compression ratio is 6.44 which is based on 1,752 bits needed for the document 604 versus 272 bits needed for the binary structure 610. The compression ratio can vary depending on the document and the script.

The binary structure 610 illustrated in FIG. 6 does not show the advantages of pre-computation, as discussed in more detail below in reference to FIG. 7. To provide a contrasting example of when pre-computation is enabled, FIG. 6 also includes a binary structure 628 that takes pre-computation into account. In various embodiments, when pre-computation is activated, some fields that are not used in the script 602 can be omitted from the binary representation 628 of the document 604 as they are not needed for processing the script 602. In this example, the binary representation 628 excludes the field "effectiveDate" from the portion 630 and, rather than just including the value for "notional" in the portion 632, the binary structure 628 includes a pre-computed value "daycount*notional" in the portion 632.

Figure 7:
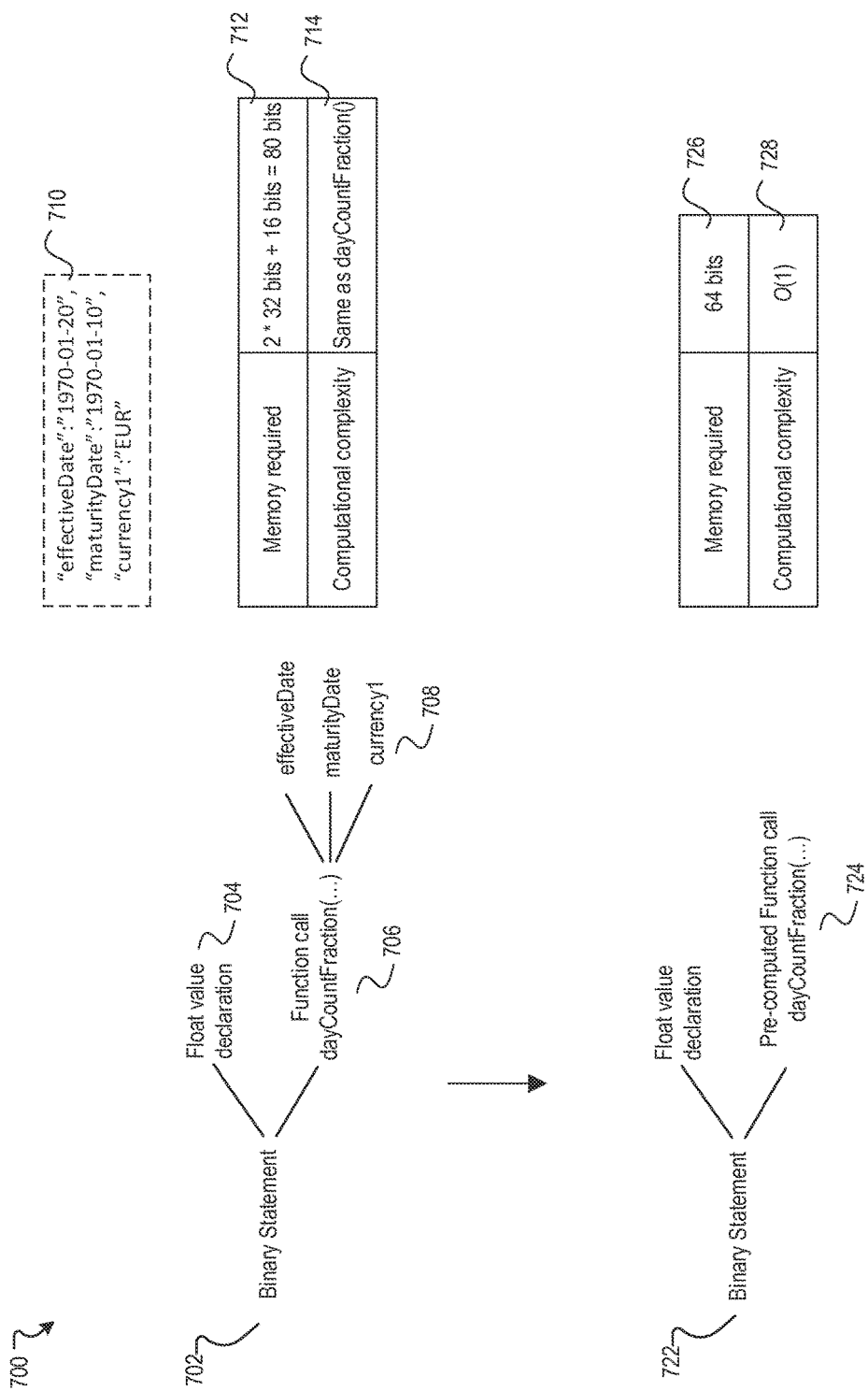
FIG. 7 illustrates an example approach for pre-computing values for a binarized document, according to an embodiment of the present disclosure.

FIG. 7 illustrates an example approach 700 for pre-computing values for a binarized document, according to an embodiment of the present disclosure. As mentioned, in some embodiments, pre-computation can be performed when binarizing a document. FIG. 7 illustrates an original syntax tree 702 for a script and a pre-computed syntax tree 722. The original syntax tree 702 includes a floating point declaration 704 and a function call "dayCountFraction( )" 706. The function call "dayCountFraction( )" 706 references variables 708. In this example, the variables 708 are pre-defined values 710. Since the values for the variables 708 are known, the function call "dayCountFraction( )" 706 can be pre-computed. As illustrated, the pre-computed syntax tree 722 references the pre-computed function call "dayCountFraction( )" 724. In various embodiments, pre-computation is performed on the CPU-side although some indirection can be made to code (e.g., Java code) that can then call any native language through an interface, such as the Java Native Interface (JNI). The results of the pre-computed call 724 can later be used when generating the parallelized code (e.g., OpenCL). In this example, pre-computing the function call helps promote efficient memory usage and reduces computational complexity. For example, the original syntax tree 702 required 80 bits of memory 712 and had a computational complexity 714 corresponding to the operations performed by the function call 706. In contrast, the pre-computed syntax tree 722 uses 64 bits of memory 726 and has a computational complexity 728 of O(1), since only the pre-computed value for the function call 724 needs to be stored.

In various embodiments, pre-computation can be performed for any function calls and/or variables that do not depend on external data (e.g., market data) or a specific calculation date (e.g., calculation Date( )). If the script calls any function calls that are written in a legacy language (e.g., C++, Java, etc.), such functions can be called during the pre-computation phase.

Figure 8:
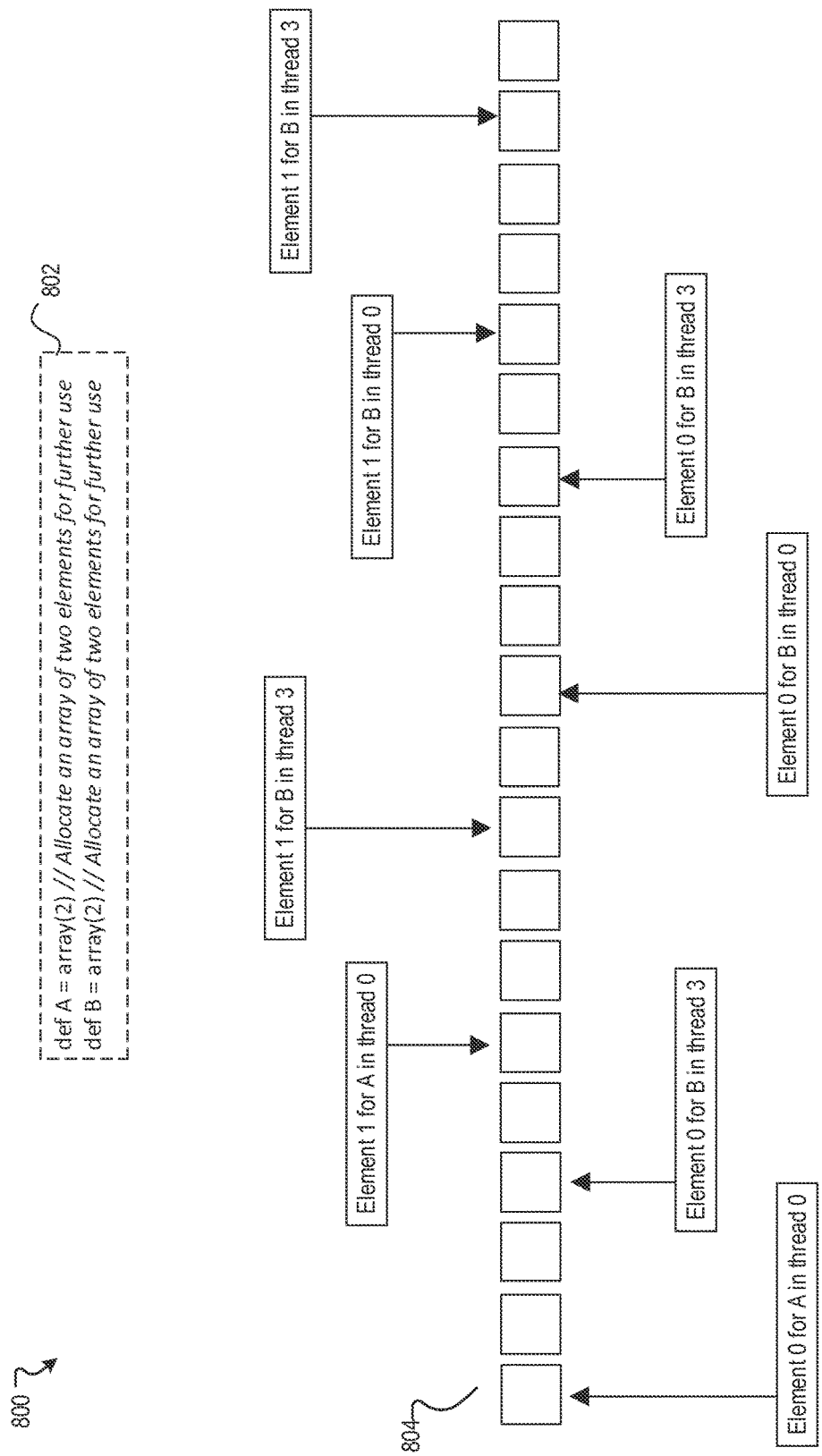
FIG. 8 illustrates memory access per thread, according to an embodiment of the present disclosure.

FIG. 8 illustrates memory access per thread, according to an embodiment of the present disclosure. In various embodiments, data structure, such as arrays, matrixes, cubes, for example, can be created dynamically in scripts. In some instances, such dynamic allocation may not be permitted. For example, a GPU may not permit dynamic allocation during execution. Thus, in some embodiments, some or all memory requirements can be pre-evaluated and, based on this pre-evaluation, the corresponding syntax tree for the script can be updated accordingly. Additionally, each thread that is utilized for concurrent execution of the script can be allocated its own memory space since, typically, every thread must have its own memory space when requesting the creation of a data structure (e.g., array) due to such memory spaces not being shared between threads.

For example, a script may describe a task for pricing a portfolio of deals. Each deal may have a corresponding document that includes various values for the functions and/or variables that are included in the script. Once parallelized, the script may be executed concurrently in a set of separate threads that each correspond to each document (or deal) being processed. To allocate the memory spaces, in various embodiments, the memory requirement of each document can be pre-computed and stored in the binary structure, or representation, corresponding to the document. At execution time, for example, by a GPU, the amount of memory needed for the execution of the documents can be allocated on the GPU. In some embodiments, if more memory is requested than that which can be handled by the GPU, a slicing mechanism can be initiated to reduce the number of documents that can be evaluated in parallel. A map can also be created to easily navigate across memory offsets. Since all memory spaces can be independent for each document, each scenario, and each date, the amount of memory required for each document execution can be determined by computing a product of the number of scenarios (NBScenarios), the number of dates (NBDates), and the memory requirement for the document. To access the correct areas of the memory, the mechanism described in reference to FIG. 9 can be utilized.

In the example of FIG. 8, the script 802 includes instructions for creating two arrays that are each of size 2. When this script 802 is executed against 5 scenarios (e.g., deals), each document corresponding the scenario will typically require a memory space 804 of 20 elements (4 total array elements×5 scenarios). In some embodiments, the memory is coalesced for each scenario (or deal) and for each array to maximize cache access when reading and/or writing to the arrays.

Figure 9:
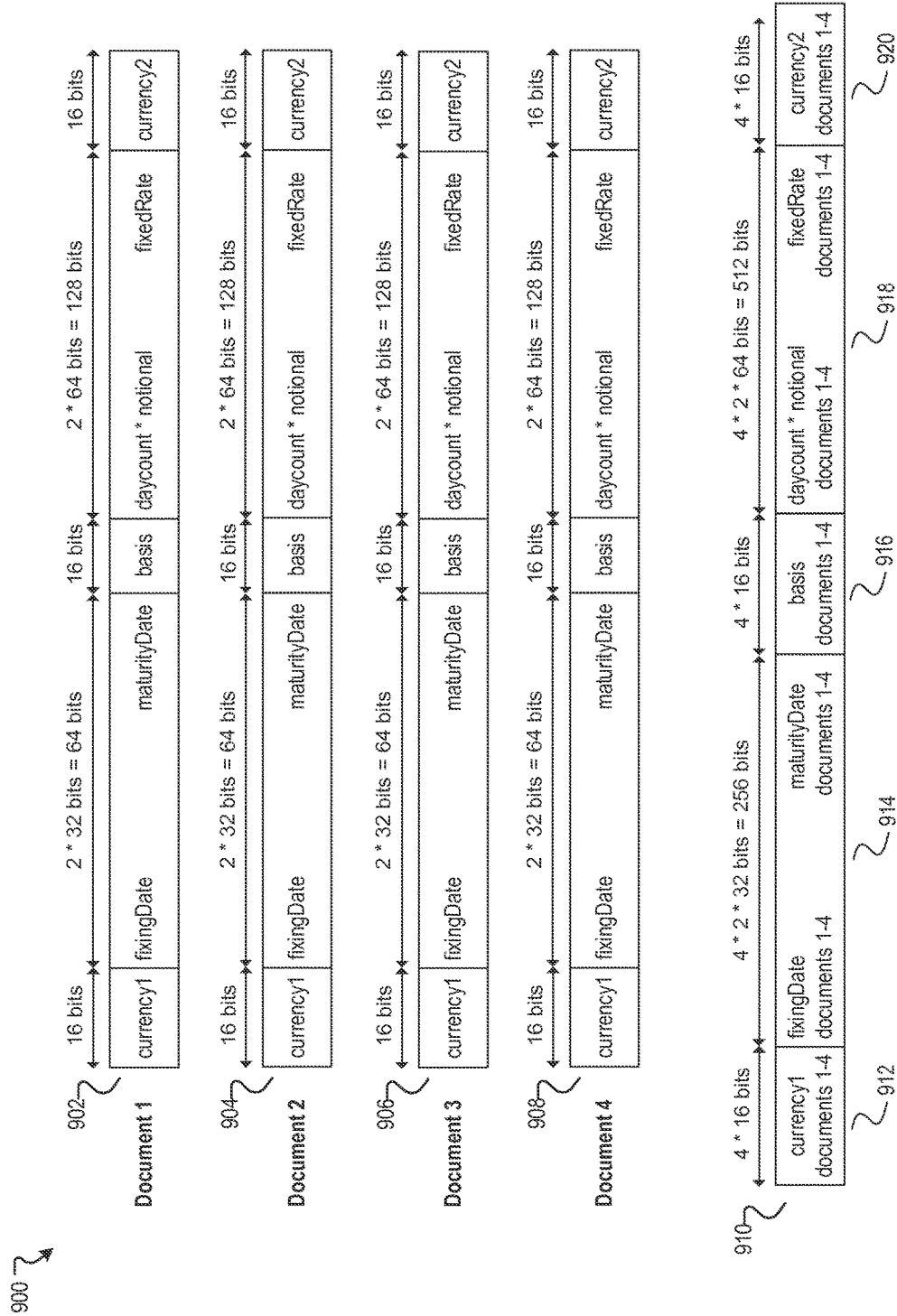
FIG. 9 illustrates example approaches for organizing binarized documents for execution, according to an embodiment of the present disclosure.

FIG. 9 illustrates example approaches 900 for organizing binarized documents for execution, according to an embodiment of the present disclosure. FIG. 9 illustrates a set of binarized documents 902, 904, 906, 908 that each store data for a set of documents (e.g., deals).

In some embodiments, when a script is executed, in parallel, against the set of binarized documents (e.g., deals) 902, 904, 906, 908, the set of binarized documents 902, 904, 906, 908 can be interlaced 910 before being sent to the parallelized computing environment (e.g., GPU) for processing. Such an approach can help maximize memory cache hits.

When interlacing documents, data values that are shared between the binarized documents 902, 904, 906, 908 can be merged as shown in the interlaced data structure 910. For example, the respective values for the variable "currency1" that correspond to the binarized documents 902, 904, 906, 908 are merged and stored in a first portion 912 of the data structure 910. Similarly, the respective values for the variables "fixingData" and "maturityDate" that correspond to the binarized documents 902, 904, 906, 908 are merged and stored in a second portion 914 of the data structure 910. The respective values for the variable "basis" that correspond to the binarized documents 902, 904, 906, 908 are merged and stored in a third portion 916 of the data structure 910. Further, the respective values for the pre-computed value "daycount*notional" and variable "fixedRate" that correspond to the binarized documents 902, 904, 906, 908 are merged and stored in a third portion 918 of the data structure 910. Finally, the respective values for the variable "currency2" that correspond to the binarized documents 902, 904, 906, 908 are merged and stored in a fourth portion 920 of the data structure 910.

In some embodiments, when a script is executed, in parallel, against the set of binarized documents (e.g., deals) 902, 904, 906, 908, a coalescence approach can be applied to the set of binarized documents 902, 904, 906, 908 before being sent to the parallelized computing environment (e.g., GPU) for processing. For example, when the script is executed by 4 processors at the same time (e.g., one processor per document), all of the processors will need to access the value of the variable "currency1". In this example, processor 1 can access the global memory of the GPU and fetch a block of 128 bits at offset 0. Typically, GPUs place these 128 bits in cache to speed up access times. When processor 2 wants to access the value for "currency1", processor 2 only needs to fetch the value for "currency1" from the cache since processor 1 has previously accessed this data. This approach can be much faster than accessing the global memory of the GPU for a second time.

Figure 10:
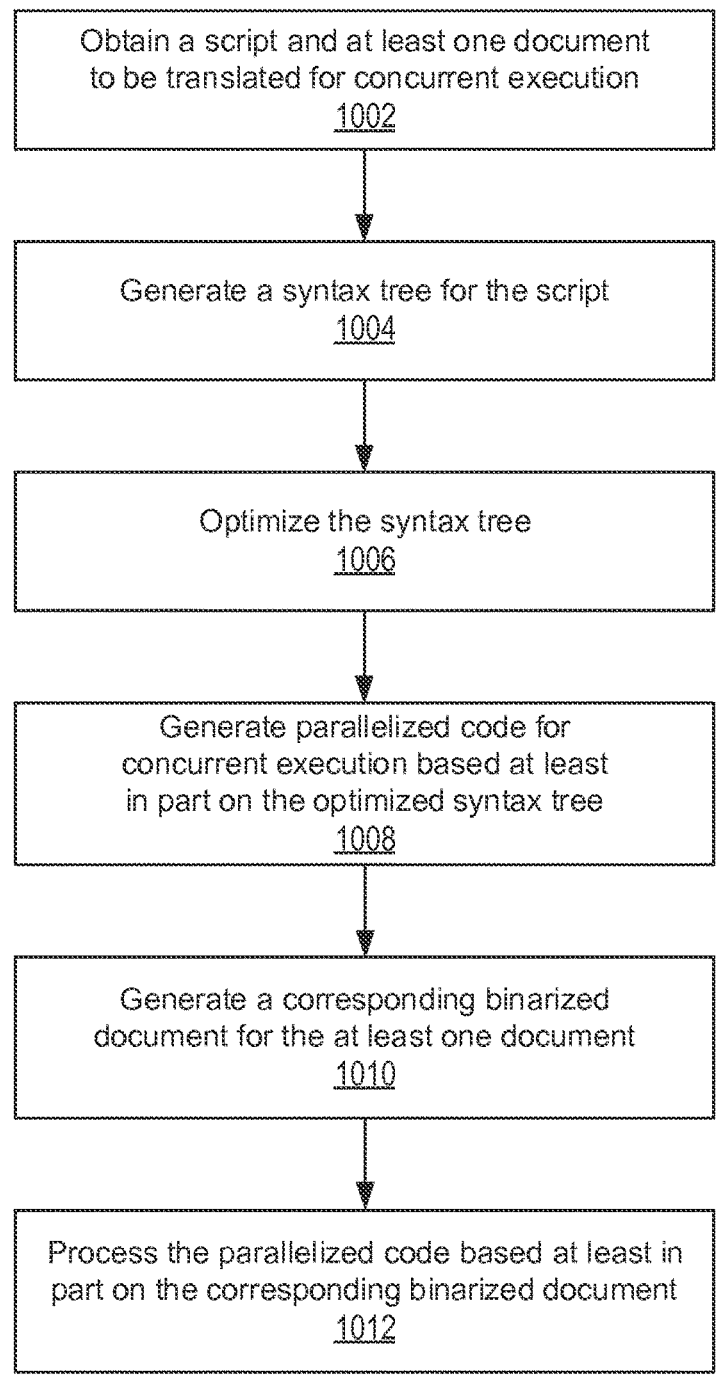
FIG. 10 illustrates an example method for automatically translating and optimizing tasks for execution in a parallelized computing environment, according to an embodiment of the present disclosure.

FIG. 10 illustrates an example method 1000 for automatically translating and optimizing tasks for execution in a parallelized computing environment, according to an embodiment of the present disclosure. It should be appreciated that there can be additional, fewer, or alternative steps performed in similar or alternative orders, or in parallel, within the scope of the various embodiments unless otherwise stated.

At block 1002, a script and at least one document can be obtained to be translated and optimized for concurrent execution, for example, in a parallelized GPU computing environment. At block 1004, a syntax tree can be generated for the script. At block 1006, the syntax tree can be optimized using various approaches, as described above. At block 1008, parallelized code (e.g., OpenCL, CUDA, Java bytecode) can be generated based at least in part on the optimized syntax tree. At block 1010, a binarized document, or structure, can be generated for the at least one obtained document. At block 1012, the parallelized code can be processed, for example, by the GPU, using the binarized document.

Hardware Implementation

Figure 11:
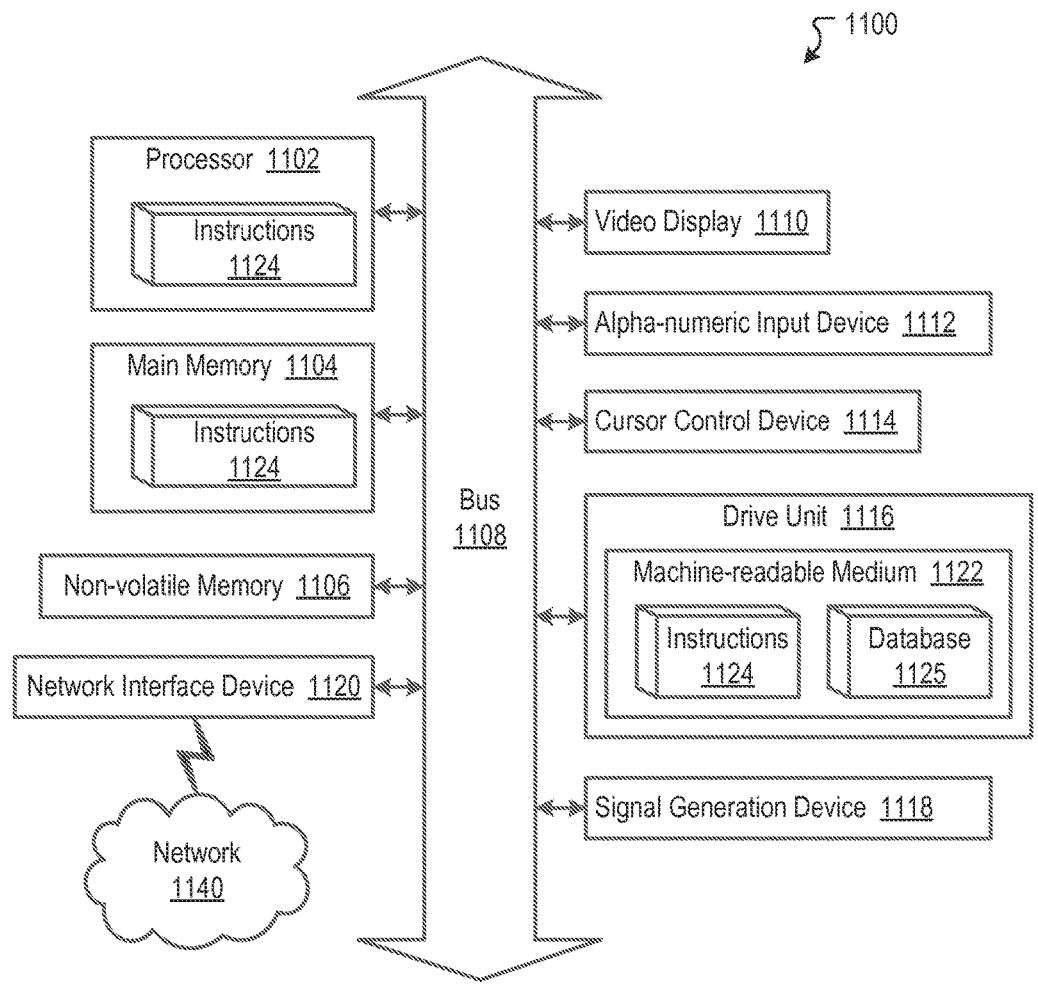
FIG. 11 is a diagrammatic representation of an embodiment of the machine, within which a set of instructions for causing the machine to perform one or more of the embodiments described herein can be executed, according to an embodiment of the present disclosure.

FIG. 11 is a diagrammatic representation of an embodiment of the machine 1100, within which a set of instructions for causing the machine to perform one or more of the embodiments described herein can be executed. The machine may be connected (e.g., networked) to other machines. In a networked deployment, the machine may operate in the capacity of a server or a client machine in a client-server network environment, or as a peer machine in a peer-to-peer (or distributed) network environment. In one embodiment, the machine communicates with the server to facilitate operations of the server and/or to access the operations of the server.

The machine 1100 includes a processor 1102 (e.g., a central processing unit (CPU), a graphics processing unit (GPU), or both), a main memory 1104, and a nonvolatile memory 1106 (e.g., volatile RAM and non-volatile RAM), which communicate with each other via a bus 1108. In some embodiments, the machine 1100 can be a desktop computer, a laptop computer, personal digital assistant (PDA), or mobile phone, for example. In one embodiment, the machine 1100 also includes a video display 1110, an alphanumeric input device 1112 (e.g., a keyboard), a cursor control device 1114 (e.g., a mouse), a drive unit 1116, a signal generation device 1118 (e.g., a speaker) and a network interface device 1120.

In one embodiment, the video display 1110 includes a touch sensitive screen for user input. In one embodiment, the touch sensitive screen is used instead of a keyboard and mouse. The disk drive unit 1116 includes a machine-readable medium 1122 on which is stored one or more sets of instructions 1124 (e.g., software) embodying any one or more of the methodologies or functions described herein. The instructions 1124 can also reside, completely or at least partially, within the main memory 1104 and/or within the processor 1102 during execution thereof by the computer system 1100. The instructions 1124 can further be transmitted or received over a network 1140 via the network interface device 1120. In some embodiments, the machine-readable medium 1122 also includes a database 1125.

Volatile RAM may be implemented as dynamic RAM (DRAM), which requires power continually in order to refresh or maintain the data in the memory. Non-volatile memory is typically a magnetic hard drive, a magnetic optical drive, an optical drive (e.g., a DVD RAM), or other type of memory system that maintains data even after power is removed from the system. The non-volatile memory may also be a random access memory. The non-volatile memory can be a local device coupled directly to the rest of the components in the data processing system. A non-volatile memory that is remote from the system, such as a network storage device coupled to any of the computer systems described herein through a network interface such as a modem or Ethernet interface, can also be used.

While the machine-readable medium 1122 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure. The term "machine-readable medium" shall accordingly be taken to include, but not be limited to, solid-state memories, optical and magnetic media, and carrier wave signals. The term "storage module" as used herein may be implemented using a machine-readable medium.

In general, routines executed to implement the embodiments of the invention can be implemented as part of an operating system or a specific application, component, program, object, module or sequence of instructions referred to as "programs" or "applications". For example, one or more programs or applications can be used to execute any or all of the functionality, techniques, and processes described herein. The programs or applications typically comprise one or more instructions set at various times in various memory and storage devices in the machine and that, when read and executed by one or more processors, cause the machine to perform operations to execute elements involving the various aspects of the embodiments described herein.

The executable routines and data may be stored in various places, including, for example, ROM, volatile RAM, non-volatile memory, and/or cache. Portions of these routines and/or data may be stored in any one of these storage devices. Further, the routines and data can be obtained from centralized servers or peer-to-peer networks. Different portions of the routines and data can be obtained from different centralized servers and/or peer-to-peer networks at different times and in different communication sessions, or in a same communication session. The routines and data can be obtained in entirety prior to the execution of the applications. Alternatively, portions of the routines and data can be obtained dynamically, just in time, when needed for execution. Thus, it is not required that the routines and data be on a machine-readable medium in entirety at a particular instance of time.

While embodiments have been described fully in the context of machines, those skilled in the art will appreciate that the various embodiments are capable of being distributed as a program product in a variety of forms, and that the embodiments described herein apply equally regardless of the particular type of machine- or computer-readable media used to actually effect the distribution. Examples of machine-readable media include, but are not limited to, recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

Alternatively, or in combination, the embodiments described herein can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description or discussed herein. In other instances, functional block diagrams and flow diagrams are shown to represent data and logic flows. The components of block diagrams and flow diagrams (e.g., modules, engines, blocks, structures, devices, features, etc.) may be variously combined, separated, removed, reordered, and replaced in a manner other than as expressly described and depicted herein.

Reference in this specification to "one embodiment", "an embodiment", "other embodiments", "another embodiment", or the like means that a particular feature, design, structure, or characteristic described in connection with the embodiment is included in at least one embodiment of the disclosure. The appearances of, for example, the phrases "according to an embodiment", "in one embodiment", "in an embodiment", or "in another embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments but also variously omitted in other embodiments. Similarly, various features are described which may be preferences or requirements for some embodiments but not other embodiments.

Although embodiments have been described with reference to specific exemplary embodiments, it will be evident that the various modifications and changes can be made to these embodiments. Accordingly, the specification and drawings are to be regarded in an illustrative sense rather than in a restrictive sense. The foregoing specification provides a description with reference to specific exemplary embodiments. It will be evident that various modifications can be made thereto without departing from the broader spirit and scope as set forth in the following claims. The specification and drawings are, accordingly, to be regarded in an illustrative sense rather than a restrictive sense.

Although some of the drawings illustrate a number of operations or method steps in a particular order, steps that are not order dependent may be reordered and other steps may be combined or omitted. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

It should also be understood that a variety of changes may be made without departing from the essence of the invention. Such changes are also implicitly included in the description. They still fall within the scope of this invention. It should be understood that this disclosure is intended to yield a patent covering numerous aspects of the invention, both independently and as an overall system, and in both method and apparatus modes.

Further, each of the various elements of the invention and claims may also be achieved in a variety of manners. This disclosure should be understood to encompass each such variation, be it a variation of an embodiment of any apparatus embodiment, a method or process embodiment, or even merely a variation of any element of these.

Further, the use of the transitional phrase "comprising" is used to maintain the "open-end" claims herein, according to traditional claim interpretation. Thus, unless the context requires otherwise, it should be understood that the term "comprise" or variations such as "comprises" or "comprising", are intended to imply the inclusion of a stated element or step or group of elements or steps, but not the exclusion of any other element or step or group of elements or steps. Such terms should be interpreted in their most expansive forms so as to afford the applicant the broadest coverage legally permissible in accordance with the following claims.

What is claimed is:

1. A computer-implemented method comprising:
    obtaining, by a computing system, at least one script and at least one document, wherein the script includes one or more instructions to be translated for execution in a parallelized computing environment, and wherein the document includes data that is referenced by the script;
    determining, by the computing system, a syntax tree for the script;
    applying, by the computing system, at least one approach for optimizing the syntax tree;
    generating, by the computing system, parallelized code for execution in the parallelized computing environment;
    determining, by the computing system, a binary representation of the document;
    pre-computing, by the computing system, a result of at least one instruction included in the script;
    in response to the pre-computing, storing, by the computing system, the result in the binary representation of the document;
    in response to the pre-computing, updating, by the computing system, the syntax tree to replace a reference to the instruction with a reference to the pre-computed result; and
    processing, by the computing system, the parallelized code based at least in part on the binary representation of the document.

2. The computer-implemented method of claim 1, wherein the script is written in Groovy programming language, and wherein the determining, by the computing system, the syntax tree for the script further comprises:
    obtaining, by the computing system, the syntax tree using an application programming interface (API) of the Groovy programming language.

3. The computer-implemented method of claim 1, wherein the applying, by the computing system, the at least one approach for optimizing the syntax tree further comprises:
    determining, by the computing system, at least one inferred type for at least one variable referenced in the syntax tree.

4. The computer-implemented method of claim 3, wherein the determining, by the computing system, the inferred type for the at least one variable further comprises:
    determining, by the computing system, that the variable corresponds to a binary statement that includes a minus operator; and
    determining, by the computing system, that the variable is one of a "double" type, a "date" type; a string type, a Boolean type, custom structured data, an array of some type, a matrix of some type, or a cube of some type.

5. The computer-implemented method of claim 3, wherein the determining, by the computing system, the inferred type for the at least one variable further comprises:
    determining, by the computing system, that the variable corresponds to a binary statement that includes a multiplication operator; and
    determining, by the computing system, that the variable is one of a "double" type, a "date" type, a string type, a Boolean type, custom structured data, an array of some type, a matrix of some type, or a cube of some type.

6. The computer-implemented method of claim 3, wherein the determining, by the computing system, the inferred type for the at least one variable further comprises:
    determining, by the computing system, that the at least one variable corresponds to an assignment statement that references a second variable; and
    determining, by the computing system, that the at least one variable corresponds to a same type as the second variable.

7. The computer-implemented method of claim 1, wherein the applying, by the computing system, the at least one approach for optimizing the syntax tree further comprises:
    replacing, by the computing system, at least one call in the script with a call to a raw function corresponding to the parallelized code.

8. The computer-implemented method of claim 1, wherein the parallelized code corresponds to a OpenCL parallelization framework, a Compute Unified Device Architecture (CUDA) parallelization framework, or Java bytecode.

9. The computer-implemented method of claim 1, wherein the generating, by the computing system, the parallelized code further comprises:

determining, by the computing system, the parallelized code by at least transforming the optimized syntax tree to a parallelization framework code.

10. The computer-implemented method of claim 1, wherein the determining, by the computing system, the binary representation of the document further comprises:
determining, by the computing system, a dictionary corresponding to the document, wherein the dictionary stores the data included in the document, and wherein data stored in the dictionary is ordered to optimize memory usage.

11. The computer-implemented method of claim 10, wherein data corresponding to a string value type is translated to a first number of bits, wherein data corresponding to a numerical value type is translated to a second number of bits, and wherein data corresponding to a date value type is translated to a third number of bits.

12. The computer-implemented method of claim 1, wherein the determining, by the computing system, the binary representation of the document further comprises:
pre-computing, by the computing system, an amount of memory needed for the document, wherein information indicating the amount of memory is stored in the binary representation of the document.

13. The computer-implemented method of claim 12, the method further comprising:
allocating, by the computing system, memory prior to executing the parallelized code based at least in part on the information indicating the amount of memory needed for the document.

14. The computer-implemented method of claim 1, the method further comprising:
obtaining, by the computing system, at least one second document, wherein the second document includes the data that is referenced by the script;
determining, by the computing system, a binary representation of the second document; and
processing, by the computing system, the parallelized code based at least in part on the binary representation of the second document.

15. The computer-implemented method of claim 1, the method further comprising:
obtaining, by the computing system, at least one second document, wherein the second document includes the data that is referenced by the script;
determining, by the computing system, a binary representation of the second document;
determining; by the computing system, an interlaced binary structure based at least in part on the binary representation of the document and the binary representation of the second document; and
processing, by the computing system, the parallelized code with respect to the document and the second document based at least in part on the interlaced binary representation.

16. The computer-implemented method of claim 15, the method further comprising:
allocating, by the computing system, memory for the document prior to executing the parallelized code;
allocating, by the computing system, memory for the second document prior to executing the parallelized code, wherein the memory allocated for the document and the memory allocated for the second document is coalesced.

17. A system comprising:
at least one processor; and
a memory storing instructions that, when executed by the at least one processor, cause the system to perform:
obtaining at least one script and at least one document, wherein the script includes one or more instructions to be translated for execution in a parallelized computing environment, and wherein the document includes data that is referenced by the script;
determining a syntax tree for the script; applying at least one approach for optimizing the syntax tree; generating parallelized code for execution in the parallelized computing environment;
determining a binary representation of the document; pre-computing a result of at least one instruction included in the script;
in response to the pre-computing, storing the result in the binary representation of the document;
in response to the pre-computing, updating the syntax tree to replace a reference to the instruction with a reference to the pre-computed result; and
processing the parallelized code based at least in part on the binary representation of the document.

18. A non-transitory computer-readable storage medium including instructions that, when executed by at least one processor of a computing system, cause the computing system to perform:
obtaining at least one script and at least one document, wherein the script includes one or more instructions to be translated for execution in a parallelized computing environment, and wherein the document includes data that is referenced by the script; determining a syntax tree for the script;
applying at least one approach for optimizing the syntax tree;
generating parallelized code for execution in the parallelized computing environment;
determining a binary representation of the document; pre-computing a result of at least one instruction included in the script;
in response to the pre-computing, storing the result in the binary representation of the document;
in response to the pre-computing, updating the syntax tree to replace a reference to the instruction with a reference to the pre-computed result; and
processing the parallelized code based at least in part on the binary representation of the document.

* * * * *